March 23, 1937.  A. W. VANCE  2,074,495

CIRCUITS FOR CATHODE RAY TUBES

Filed Sept. 29, 1934    2 Sheets-Sheet 1

INVENTOR
Arthur W. Vance
BY 
ATTORNEY

March 23, 1937.  A. W. VANCE  2,074,495
CIRCUITS FOR CATHODE RAY TUBES
Filed Sept. 29, 1934    2 Sheets-Sheet 2

INVENTOR
Arthur W. Vance
BY T. R. Goldsborough
ATTORNEY

Patented Mar. 23, 1937

2,074,495

UNITED STATES PATENT OFFICE 2,074,495

CIRCUITS FOR CATHODE-RAY TUBES

Arthur W. Vance, Philadelphia, Pa., assignor, by mesne assignments, to Radio Corporation of America, New York, N. Y., a corporation of Delaware Application September 29, 1934, Serial No. 746,096

8 Claims. (Cl. 250—27)

My invention relates to cathode-ray tube apparatus and particularly to a method and means for obtaining a high voltage.

One of the problems in designing a system in which a cathode-ray tube is utilized is that of obtaining the necessary high voltage for the tube electrodes, especially for the second anode of a common type tube. Although there is no particular difficulty in merely obtaining the desired voltage, the resulting voltage supply unit is usually rather costly. The transformer for stepping up the voltage of 60 cycle current from 110 volts to 4000 volts, for example, is an expensive unit.

It is accordingly an object of my invention to provide an improved method and means for obtaining a high voltage.

More specifically, it is an object of my invention to provide a method and means for obtaining high voltage direct current for the second anode of a cathode-ray tube.

A further object of my invention is to provide an improved deflecting circuit for cathode-ray tubes.

In practicing my invention, I utilize the high voltage which is produced by the sudden collapse of flux in an inductance coil. Specifically, in cathode-ray tube apparatus wherein the tube is provided with deflecting coils, I connect a rectifier circuit across the said coils whereby the high voltage produced across them during the flow of saw-tooth current therethrough is rectified. The rectified high voltage current charges a condenser which supplies the desired high voltage to the second anode of the cathode-ray tube.

Other objects, features and advantages of my invention will appear from the following description taken in connection with the accompanying drawings, in which—

Figure 1:
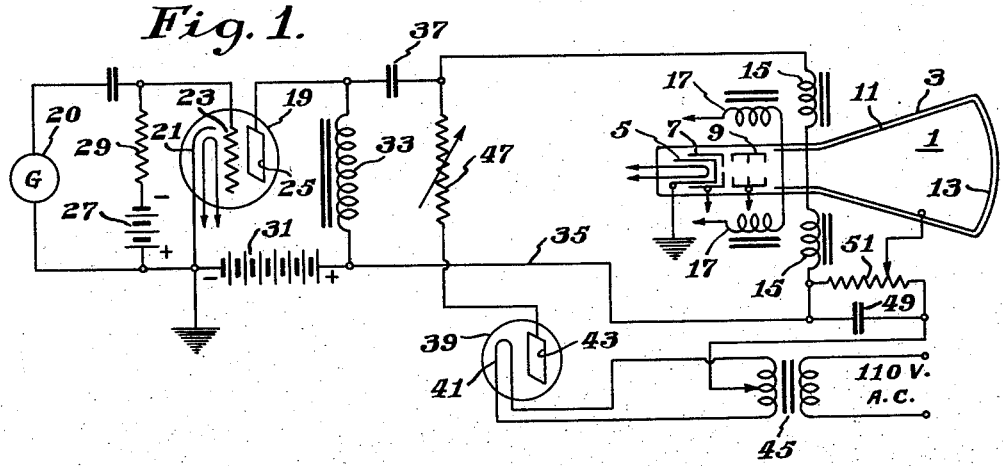
Figure 1 is a circuit diagram of one embodiment of my invention.

In Fig. 1 my invention is shown applied to a television receiver which includes a cathode-ray tube 1. The particular cathode-ray tube illustrated is of a well-known type comprising an evacuated envelope 3 having an electron gun therein which consists of an indirectly heated cathode 5, a control grid 7 and a first anode 9. A second anode 11, consisting of a silver coating on the inside of the envelope 3, is provided for accelerating the electrons and for aiding in the electrostatic focusing. The usual fluorescent screen 13 is provided at the large end of the tube.

In accordance with common practice, the cathode-ray tube is provided with one pair of deflecting coils 15 for deflecting the electron beam horizontally and another pair of deflecting coils 17 for deflecting the electron beam vertically, whereby the fluorescent screen 13 may be scanned to produce a picture.

The horizontal deflection is produced by a flow of current, having a saw-tooth wave form, through the deflecting coils 15. The circuit for producing this flow of saw-tooth current includes an electric discharge tube 19 which may be a three-electrode vacuum tube having a cathode 21, a control grid 23 and an anode 25. The control grid 23 is maintained at a suitable negative bias by means of a source of biasing potential, such as a biasing battery 27, connected in series with a grid resistor 29.

The anode 25 is maintained at a suitable positive potential by means of a suitable supply source, such as a battery 31, the positive potential being applied to the anode 25 through a choke coil 33. In this particular embodiment of the invention, the deflecting coils 15 are connected across the choke coil 33 through a conductor 35 and a coupling condenser 37, the coupling condenser 37 having sufficient capacity to make its impedance at the horizontal deflecting frequency very low.

Figure 2:
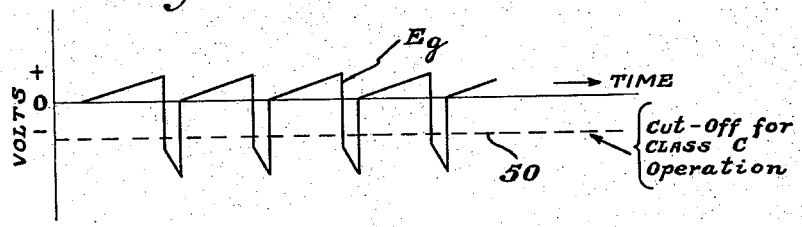
Figs. 2, 3 and 4 are curves which are referred to in explaining my invention.
Figure 3:
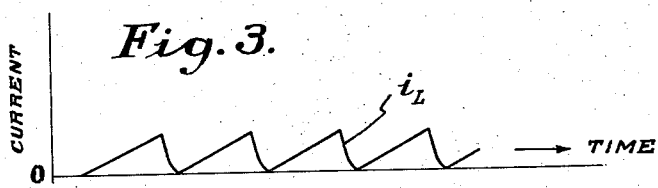
Figure 4:
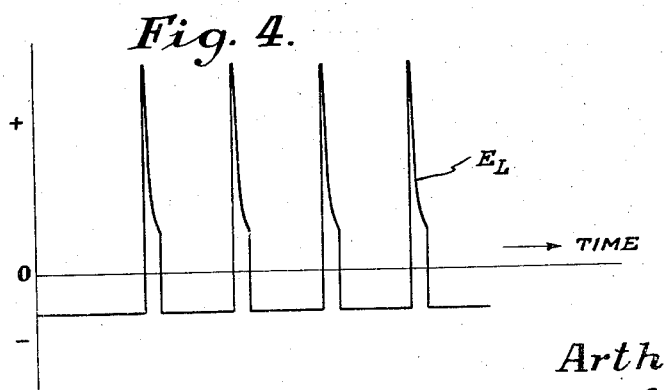
Figure 4:
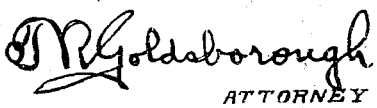

The operation of the circuit thus far described will be understood by referring to the curves shown in Figs. 2, 3 and 4. In Fig. 2 the curve $E_g$ represents the voltage which is impressed upon the input terminals of the vacuum tube 19 from a suitable generator or vacuum tube network 20 for producing a flow of saw-tooth current through the deflecting coils 15. The current flowing through the deflecting coils 15 is represented by the curve $i_L$ in Fig. 3. It will be noted that the voltage represented by the curve in Fig. 2 has two components, one consisting of a series of flat-top impulses and the other consisting of a saw-tooth voltage, the saw-tooth component being necessary for producing a good saw-tooth current in the deflecting coils because of the plate impedance of the vacuum tube 19 and because of a small amount of resistance in the deflecting coils 15.

As shown by the curve $E_L$ in Fig. 4, a very high voltage appears across the deflecting coils 15 during what its commonly referred to as the "return line period". In accordance with my invention I utilize this high voltage for supplying the second anode 11 with the necessary high voltage.

Referring again to Fig. 1, the circuit for obtaining the second anode voltage includes a rectifier 39 having a cathode 41 and an anode 43, the cathode 41 being supplied with heating current from any suitable source through a transformer 45.

The rectifier 39 is connected across the deflecting coils 15 in series with a resistor 47 and a filter condenser 49. The rectifier circuit may be traced from the upper terminal of the deflecting coils 15 through the resistor 47 and the rectifier tube 39 to the mid-point of the secondary winding of the transformer 45 and from the secondary mid-point through the filter condenser 49 to the lower terminal of the deflecting coils 15. The resistor 47 is provided in order to prevent the rectifier tube 39 from putting too great a load across the deflecting coils 15. With certain types of rectifiers it may be omitted.

It will be evident that the positive voltage impulses appearing across the deflecting coils 15 cause a flow of current through the rectifier tube 39 to charge the filter condenser 49. By connecting the second anode 11 to the positive terminal of the filter condenser 49 or to a potentiometer 51 shunted across the condenser 49, it is maintained at a high positive potential with respect to ground.

It will be noted that the voltage of the plate battery 31 is in series with the voltage appearing across the filter condenser 49 so that the two voltages add to give the total voltage applied to the second anode. It may be stated that the second anode current of the cathode-ray tube illustrated is very small so that ample high voltage energy is supplied by the deflecting coils 15 without placing too great a load across them.

Figure 5:
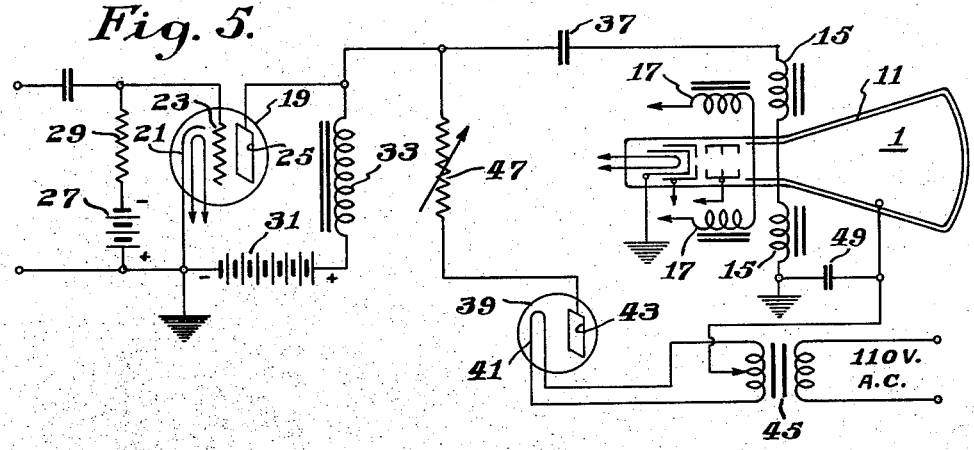
Figs. 5, 6 and 7 are circuit diagrams of other embodiments of my invention.

The circuit shown in Fig. 5 differs from that shown in Fig. 1 in that the lower terminal of the deflecting coils 15 is connected to ground. In the two figures like parts are indicated by the same reference numerals. Where the deflecting coils are connected to ground it is preferred to connect the rectifier resistor 47 on the anode side of the coupling condenser 37, as illustrated, in order that the voltage of the plate supply battery 31 will be added to the voltage appearing across the filter condenser 49.

Figure 6:
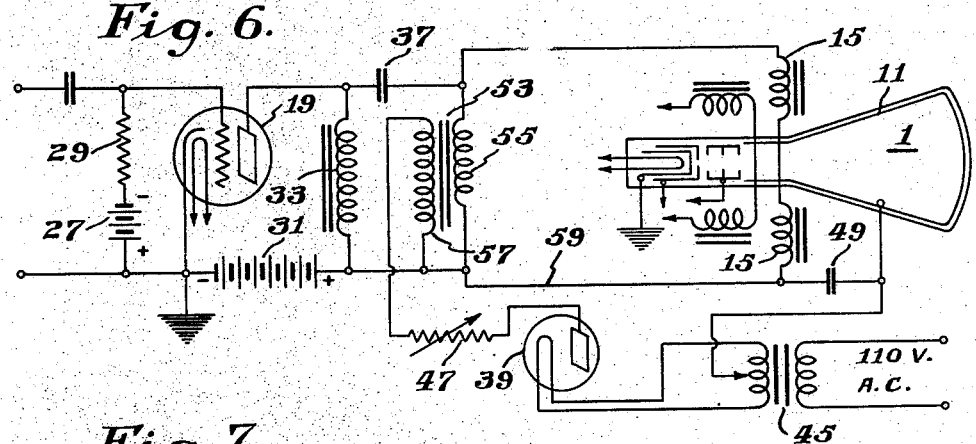

The circuit shown in Fig. 6 differs mainly from the other embodiments of my invention in that the voltage appearing across the deflecting coils 15 is applied to the rectifier through a transformer 53. In Figs. 1 and 6 like parts are indicated by the same reference numerals.

Referring to Fig. 6, the circuit includes the transformer 53 having a primary winding 55 and a secondary winding 57. The primary winding 55 is connected across the deflecting coils 15. One terminal of the secondary winding 57 is connected to one terminal of the filter condenser 49 through a conductor 59 while the other end of the secondary winding is connected to the other terminal of the filter condenser 49 through the resistor 47 and rectifier 39.

By utilizing the transformer 53, the filter condenser 49 may be charged to higher voltages than would be feasible if the maximum voltage obtainable were limited to the voltage appearing across the deflecting coils 15. It is preferred to connect the primary of the transformer 53 across the horizontal deflecting coils rather than the vertical deflecting coils since the voltage impulses appear thereacross at a comparatively high frequency. This makes possible a very economical transformer design since a transformer transfers energy much better at high frequencies than at low frequencies.

In addition to the feature of supplying a high voltage, my invention has an additional advantage in that it improves the operation of the deflecting circuit. In my copending application, Serial No. 741,230, filed August 24, 1934, and assigned to the RCA Victor Company, Inc., I describe and claim a cathode-ray tube deflecting circuit in which the deflecting coils are shunted by a resistor in order to obtain greater deflection. In that circuit the deflecting coils discharge through the resistor, instead of through the vacuum tube, during the return line period whereby the vacuum tube is given a period in which to cool. One disadvantage of the circuit is that during the deflection period a certain amount of current flows through the resistor which is in shunt to the deflecting coils to produce an undesired energy loss.

In my present circuit the rectifier circuit is shunted across the deflecting coils in place of a simple resistor whereby the deflecting coils will discharge through the rectifier during the return line period to reduce the load on the vacuum tube. It will be apparent, however, that there can be no flow of current through the rectifier circuit during the deflecting period to produce an energy loss such as the one mentioned above.

Preferably the present circuit is operated in the manner described in my above-mentioned copending application to give what is substantially "Class C" operation. When operated in this manner the voltage impulses applied to the input circuit of vacuum tube 19 are given a magnitude sufficient to drive the vacuum tube 19 beyond the cut-off point (indicated by the dotted line 50 in Fig. 2) whereby the deflecting coils 15 discharge only through the rectifier circuit. It may be noted that the return line portion of the saw-tooth wave shown in Fig. 3 departs from a straight line and that the voltage impulses shown in Fig. 4 are not flat topped because of the discharge of the deflecting coils 15 through the rectifier circuit, this being a logarithmic discharge.

Figure 7:
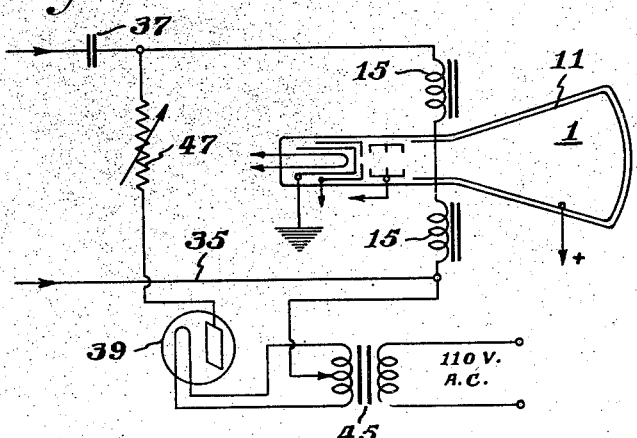

As illustrated in Fig. 7, where parts similar to those in Fig. 1 are indicated by like reference numerals, a rectifier may be connected across the deflecting coils 15 solely for the purpose of increasing the magnitude of deflection with a given size vacuum tube in accordance with the teachings of my above mentioned copending application. In this embodiment of my invention, the condenser 49 is omitted, the second anode 11 being supplied with a high positive voltage from any suitable source (not shown).

Considering my invention as a circuit for supplying a high voltage without the use of a transformer, it will be understood that it is of general application and is not limited to a cathode-ray tube deflecting circuit. Any suitable conductors may be utilized in place of deflecting coils.

It will be apparent that various other modifications may be made in my invention and I desire, therefore, that only such limitations shall be placed thereon as are necessitated by the prior art and set forth in the appended claims.

I claim as my invention:

1. In cathode-ray tube apparatus, a cathode-ray tube having deflecting coils, means for producing a flow of saw-tooth current through said coils whereby voltage impulses appear thereacross, and means for deriving a unidirectional voltage from the voltage impulses appearing across said coils.

2. In cathode-ray tube apparatus, a cathode-ray tube of the type having a second anode, deflecting coils for said cathode-ray tube, means for producing a flow of saw-tooth current through said coils whereby voltage impulses appear thereacross, means for deriving a unidirectional voltage from the voltage impulses appearing across said coils, and means for applying said unidirectional voltage to said second anode.

3. In combination, a cathode-ray tube, deflecting coils for said tube, means for producing a flow of deflecting current through said coils, said means including an electric discharge tube having an output circuit connected to said coils, and a circuit including a rectifier connected across said coils.

4. The invention according to claim 1 characterized in that said last means comprises a rectifier and a capacitor connected in series across said coils.

5. In a television receiver including a cathode-ray tube provided with both horizontal and vertical deflecting coils and in which voltage impulses are applied to said horizontal deflecting coils at a more rapid rate than to said vertical deflecting coils for causing an electron beam to scan a fluorescent screen, a rectifier and a capacitor connected in series and shunted across said horizontal deflecting coils whereby a unidirectional voltage appears across said capacitor.

6. In apparatus comprising a cathode-ray tube having deflecting coils, a rectifier connected across said coils, and a vacuum tube having its output circuit coupled to said deflecting coils, the method of causing a flow of deflecting current through said coils which includes the step of periodically driving said vacuum tube to plate current cut-off.

7. In combination, a cathode-ray tube having deflecting coils, a vacuum tube having a control electrode and an output circuit, said output circuit being coupled to said deflecting coils, means for impressing negative voltage impulses periodically upon said control electrode whereby energy stored in said coils tends to discharge through said vacuum tube for the duration of each of said impulses, and means connected in shunt to said coils to reduce the amount of said stored energy which discharges through said vacuum tube.

8. In cathode-ray tube apparatus, a cathode ray tube, deflecting coils for said tube, means for producing a flow of saw-tooth deflecting current through said coils, and a rectifier connected across said coils for deriving a unidirectional voltage from the voltage impulses appearing thereacross.

ARTHUR W. VANCE.

---

CERTIFICATE OF CORRECTION.

Patent No. 2,074,495.            March 23, 1937.

ARTHUR W. VANCE.

It is hereby certified that error appears in the printed specification of the above numbered patent requiring correction as follows: Page 2, second column, line 62, for the word "conductors" read inductors; and that the said Letters Patent should be read with this correction therein that the same may conform to the record of the case in the Patent Office.

Signed and sealed this 16th day of November, A. D. 1937.

(Seal)

Henry Van Arsdale,
Acting Commissioner of Patents.